(12) United States Patent
Acharya et al.

(10) Patent No.: US 12,086,899 B2
(45) Date of Patent: Sep. 10, 2024

(54) GRAPHICS PROCESSING UNIT WITH SELECTIVE TWO-LEVEL BINNING

(71) Applicant: ADVANCED MICRO DEVICES, INC., Santa Clara, CA (US)

(72) Inventors: Anirudh R. Acharya, San Diego, CA (US); Ruijin Wu, San Diego, CA (US); Paul E. Ruggieri, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/032,268

(22) Filed: Sep. 25, 2020

(65) Prior Publication Data
US 2022/0044350 A1    Feb. 10, 2022

Related U.S. Application Data

(60) Provisional application No. 63/062,770, filed on Aug. 7, 2020.

(51) Int. Cl.
G06T 1/20 (2006.01)
G06F 9/48 (2006.01)
G06T 1/60 (2006.01)

(52) U.S. Cl.
CPC .............. G06T 1/20 (2013.01); G06F 9/4893 (2013.01); G06T 1/60 (2013.01)

(58) Field of Classification Search
CPC . G06T 1/20; G06T 1/60; G06F 9/4893; G06F 1/3243
USPC ......................................................... 345/501
See application file for complete search history.

(56) References Cited

U.S. PATENT DOCUMENTS

| 8,817,026 B1 * | 8/2014 | Zimmerman ........... G06T 15/06 |
| | | 345/426 |
| 10,325,343 B1 | 6/2019 | Zhao et al. |
| 2004/0161064 A1 * | 8/2004 | Brethour ................ H04B 1/719 |
| | | 375/347 |

(Continued)

FOREIGN PATENT DOCUMENTS

| KR | 101723127 B1 | 4/2017 |
| KR | 101780059 B1 | 9/2017 |
| WO | 2018044738 A1 | 3/2018 |

OTHER PUBLICATIONS

U.S. Appl. No. 17/231,425, filed Apr. 15, 2021, listing Anirudh R. Acharya et al. as inventors, entitled "Processing System With Selective Priority-Based Two-Leveling Binning".

(Continued)

*Primary Examiner* — James A Thompson
*Assistant Examiner* — Kim Thanh T Tran

(57) ABSTRACT

Systems and methods related to run-time selection of a render mode in which to execute command buffers with a graphics processing unit (GPU) of a device based on performance data corresponding to the device are provided. A user mode driver (UMD) or kernel mode driver (KMD) executed at a central processing unit (CPU) selects abinning mode based on whether performance data that includes sensor data or performance counter data indicates that an associated binning condition or override condition has been met. The UMD or the KMD causes pending command buffers to be patched to execute in the selected binning mode based on whether the binning mode is enabled or disabled.

14 Claims, 4 Drawing Sheets

(56) References Cited

U.S. PATENT DOCUMENTS

| | | | |
|---|---|---|---|
| 2006/0139699 A1* | 6/2006 | Hara | H04N 1/32112 358/462 |
| 2007/0296725 A1 | 12/2007 | Steiner et al. | |
| 2008/0301687 A1* | 12/2008 | Gosalia | G06F 9/4843 718/103 |
| 2009/0003409 A1* | 1/2009 | Hwang | G11C 11/40626 374/170 |
| 2012/0079480 A1* | 3/2012 | Liu | G06F 11/3409 718/1 |
| 2012/0293519 A1* | 11/2012 | Ribble | G06T 15/005 345/501 |
| 2013/0135341 A1* | 5/2013 | Seetharamaiah | G06T 11/40 345/522 |
| 2013/0342547 A1 | 12/2013 | Lum et al. | |
| 2014/0263964 A1* | 9/2014 | Yang | H04N 25/46 250/208.1 |
| 2015/0302546 A1* | 10/2015 | Balci | G06T 11/40 345/522 |
| 2015/0317762 A1 | 11/2015 | Park et al. | |
| 2017/0061568 A1 | 3/2017 | Metz et al. | |
| 2017/0083364 A1 | 3/2017 | Zhao et al. | |
| 2017/0083998 A1 | 3/2017 | Acharya | |
| 2018/0165788 A1 | 6/2018 | Balci et al. | |
| 2019/0005604 A1 | 1/2019 | Acharya et al. | |
| 2019/0122417 A1 | 4/2019 | Mantor et al. | |
| 2019/0221009 A1* | 7/2019 | Nellutla | G06F 1/329 |
| 2019/0362005 A1 | 11/2019 | Sen et al. | |
| 2020/0082493 A1 | 3/2020 | Wang et al. | |
| 2020/0090396 A1 | 3/2020 | Holmes et al. | |

OTHER PUBLICATIONS

Non-Final Office Action mailed Dec. 21, 2021 for U.S. Appl. No. 17/231,425, 39 pages.
International Search Report and Written Opinion mailed Mar. 2, 2022 for PCT/US2021/059172, 11 pages.
Syed Hamid Hussain Madni et al., "Performance comparison of heuristic algorithms for task scheduling in IaaS cloud computing environment", PLOS ONE, vol. 12, No. 5, May 3, 2017, pp. 1-26.
International Search Report and Written Opinion mailed Nov. 23, 2021 for PCT/US2021/044720, 10 pages.
Final Office Action issued in U.S. Appl. No. 17/231,425 mailed Jul. 8, 2022, 51 pages.
International Preliminary Report on Patentability issued in Application No. PCT/US2021/044720, mailed Feb. 16, 2023, 6 pages.
International Preliminary Report on Patentability mailed May 25, 2023 for PCT/US2021/059172, 7 pages.
Extended European Search Report issued in Application No. 21853333, mailed Feb. 2, 2024, 10 pages.

* cited by examiner ical objects
include points, lines, polygons, and three-dimensional (3D)

GRAPHICS PROCESSING UNIT WITH SELECTIVE TWO-LEVEL BINNING

BACKGROUND

Computer processing systems generally employ a graphics processing unit (GPU) to perform graphics operations, such as texture mapping, rendering, vertex translation, and the like. The performance requirements or specifications for the GPU can vary depending on the type of associated electronic device. For example, a GPU used in mobile devices or other battery-powered devices has characteristics and requirements that can diverge significantly from other non-battery-powered platforms. Performance, battery life, and thermals are generally important metrics for battery-powered device platforms, with sustained performance and low idle power consumption and temperature being desirable. However, a tradeoff generally exists between GPU performance and battery life/thermals in battery-powered devices.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
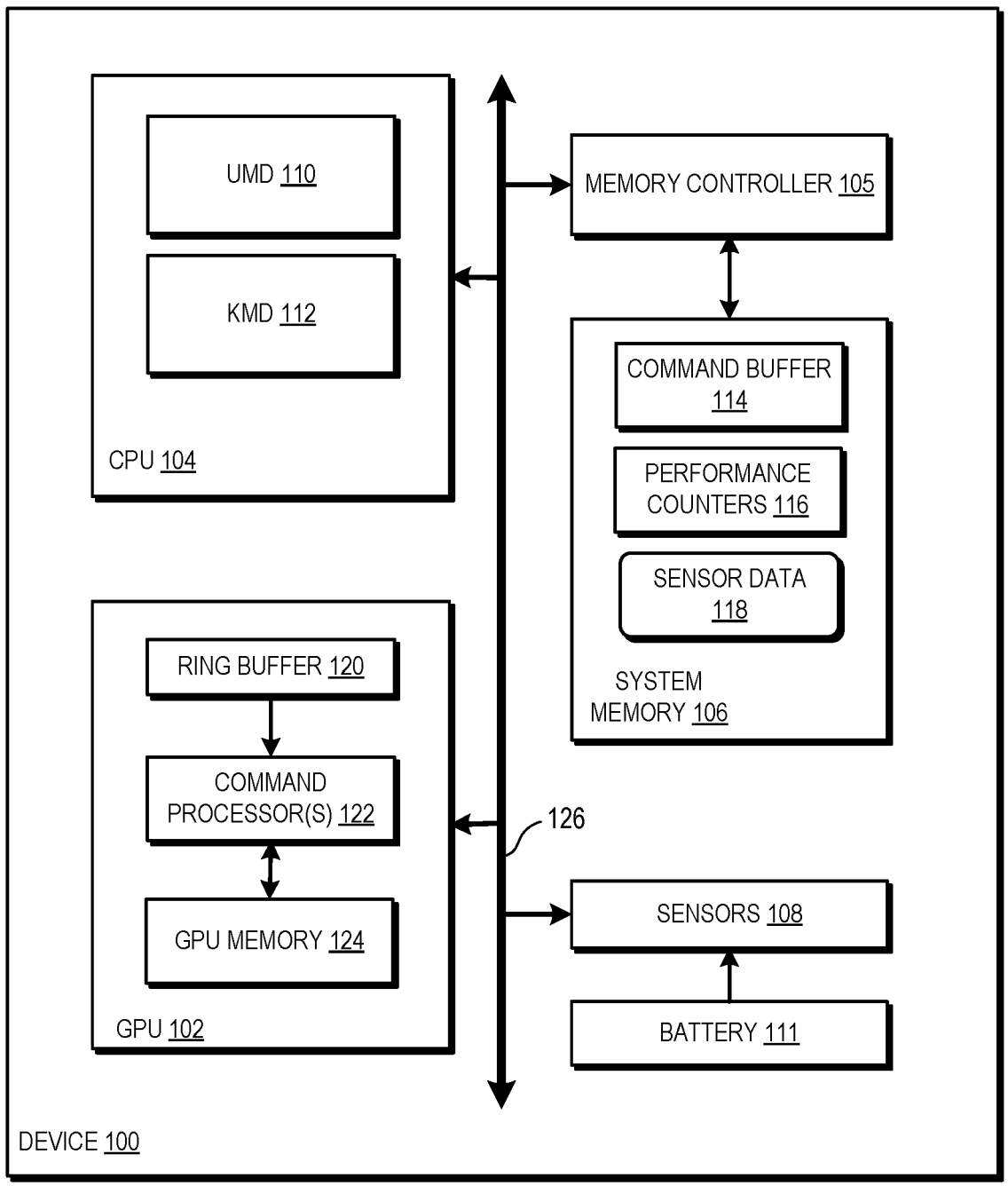
FIG. 1 is a block diagram of an illustrative device that selectively sets a primitive binning mode based on GPU performance data, in accordance with some embodiments.

Using the techniques described herein, a GPU selects a primitive binning mode (sometimes referred to herein as a "binning mode") based on the performance characteristics of the GPU. The binning mode determines how an image frame is divided into regions, and how primitives are assigned to bins corresponding to each region. By selecting the binning mode based on the performance characteristics, the GPU adapts the binning process according to the operating conditions of an electronic device, thereby improving the user experience.

To illustrate, translating information about three-dimensional (3D) objects into a two-dimensional (2D) image frame that can be displayed is known as rendering and in some cases requires the device that performs the rendering to utilize considerable processing power and memory resources. Pixels within an image frame are produced by rendering graphical objects in order to determine color values for respective pixels. Example graphical objects include points, lines, polygons, and three-dimensional (3D) higher-order surfaces. Points, lines, and polygons represent rendering primitives which are the basis for most 3D rendering instructions. More complex structures, such as 3D objects, are formed from a combination or a mesh of such primitives. To display a particular scene using conventional rendering techniques, a GPU renders the primitives with potential contributing pixels associated with the scene individually, on a per-primitive basis by determining pixels that fall within the edges of each primitive and obtaining the attributes of the primitives that correspond to each of those pixels.

In other cases, a GPU renders primitives using a binning process, wherein the GPU divides the image frame into regions, identifies the primitives that intersect with a given region, and places the identified primitives into a bin corresponding to the given region. Thus, each region of the frame is associated with a corresponding bin, with the bin including the primitives, or portion of the primitives, that intersect with the associate bin. The GPU renders the frame on a per-bin basis by rendering the pixels of the primitives that intersect with the region of the frame corresponding to the bin. This allows the GPU to, at least in some cases, render a frame more efficiently, such as by requiring fewer memory accesses, increasing cache usage, and the like.

An example of a binning process is primitive batch binning (PBB), wherein, a GPU receives a sequence of primitives and opportunistically segments the primitives into temporally related primitive batches. Sequential primitives are captured until a predetermined condition is met, such as a batch full condition, state storage full condition, or a dependency on previously rendered primitives is determined. When performing PBB, a screen space that displays a rendered primitive is divided into several blocks. Each block of screen space is associated with a respective bin. Each primitive of the received sequence of primitives of a batch intersects one or more bins. For each received primitive in a batch the initial bin intercept is computed, where an initial bin intercept is the upper-most left bin of the screen which the primitive intersects. After a batch is closed, a first bin for processing is identified. Primitives intercepting the identified bin are processed. For each primitive identified intercepting the bin, the next bin intercept is identified and the pixels included in the primitive that are enclosed by the identified bin are sent for detailed rasterization. The next bin intercept is the next upper-most left bin in raster order which the processed primitive intersects.

In some embodiments, a GPU implements different binning techniques, referred to herein as binning modes or primitive binning modes, wherein different binning modes correspond to different region sizes for each bin, different numbers of binning levels, and the like. For example, in some embodiments, the GPU includes both single level and two-level binning modes. In the single level binning mode, also referred to as primitive batch binning (PBB) mode, the GPU divides the image frame into a specified number of regions and renders each region as described above.

In the two-level binning mode, two types of binning are performed: coarse level binning and fine level binning. In some embodiments, coarse level binning uses large bins (e.g., 32 bins total to cover an entire display area), which reduces binning overhead. Per-coarse-bin visibility information is generated during the rendering of the first coarse bin (i.e., coarse bin 0), and is used for rendering other coarse bins. After coarse level binning, fine level binning is performed for each coarse bin, sequentially. In some embodiments, fine level binning involves performing primitive batch binning (PBB) to divide each coarse bin into smaller "fine" bins such as by further binning each coarse bin into a 64×64 array of fine bins during PBB-based fine level binning. Each fine bin is then rendered using rendering information, such as primitive visibility information, generated for the corresponding coarse bin. In some embodiments, two-level binning occurs at the top of the graphics processing pipeline (e.g., prior to vertex processing and rasterization), which contrasts with the single-level PBB-only binning mode, which occurs in the middle of the graphics processing pipeline, (e.g., after vertex processing and prior to pixel-shading).

In some cases, different binning modes are suitable for different device conditions. For example, single-level or PBB binning mode (where only PBB is used without the combination of coarse and fine level binning described above) under some conditions provides better performance than two-level binning but at the cost of increased power consumption and higher operating temperature for the device. In contrast, in some cases, two-level binning supports reduced power consumption at the cost of some performance.

To adapt the binning mode according to device conditions, in some embodiments a GPU employs a selective two-level binning architecture that supports the run-time selection of the render mode. For example, in some embodiments, a device implementing the selective two-level binning architecture implements a run-time selection of one of a two-level binning mode and a default render mode, such as a PBB render mode in which only PBB is performed. The selection of the binning mode is based on any of a number of performance criteria, such as thermal characteristics, power characteristics (e.g. battery life), and the like. For example, in some embodiments, a driver, such as a user-mode driver (UMD) or kernel-mode driver (KMD), receives performance data, such as sensor data and performance counter data, and selects the binning mode based on the performance data.

The techniques described herein enable such pending command buffers to be modified via command buffer patching such that one or more workloads of the command buffers are configured to be executed in accordance with the current two-level binning mode or a non-two-level binning mode, such as PBB render mode, depending on whether the two-level binning mode is enabled. Herein, command buffer patching refers to the modification of the data within a command buffer by a driver or other module executed by a CPU or GPU and is performed at either the CPU or at the GPU.

FIG. 1 illustrates an example of a device 100 that includes a parallel processor, and in particular a GPU 102, in accordance with some embodiments. The device 100 implements a two-level binning architecture that allows for run-time selection of a render mode with which to render image data. In addition to the GPU 102, the device 100 includes a CPU 104, a memory controller 105, a system memory 106, sensors 108, and a battery 111. In some embodiments, the GPU 102, the CPU 104, the memory controller 105, and the sensors 108 are communicatively coupled together via a bus 126. The memory controller 105 manages memory access requests provided by the GPU 102, the CPU 104, and the sensors 108 for accessing the system memory 106.

During a graphics processing operation, an application at the system memory 106 generates commands for instructing the GPU 102 to render image data at defined locations in the system memory 106 for subsequent display in an image frame at an electronic display (not shown) of the device 100. The commands output by the application are recorded onto a command buffer 114 by a UMD 110 that is executed at the CPU 104. A given command buffer 114 includes commands one or multiple workloads, and each workload is configured to be executed in a two-level binning mode, a non-two-level binning mode, or is executable in either mode. Upon completing the recording of commands to the command buffer 114 by the UMD 110, a KMD 112 submits the command buffer 114 to the GPU 102 where the command buffer 114 is loaded onto a ring buffer 120 of the GPU 102. One or more command processors 122 of the GPU 102 retrieve commands corresponding to a particular command buffer 114 from the ring buffer 120 and execute those commands by, for example, retrieving image data from the system memory 106, and instructing shaders, compute units, and other graphics processing circuitry (not shown) to render the retrieved image data. In the example of FIG. 1, the GPU 102 selects between a two-level binning mode and a single-level binning mode, such as a PBB mode (sometimes referred to herein as a "single-level PBB mode" or a "single-level PBB-only binning mode"), when executing workloads of each command buffer 114. In some embodiments, the GPU 102 selects which binning mode to use to execute workloads of each command buffer 114 based on one or more status bits stored in the system memory 106 or based on one or more patch enable bits (described below) stored in the GPU memory 124. In some embodiments, the GPU 102 selects the binning mode based on the status bits or patch enable bits when executing corresponding logic of a command buffer 114 that causes the GPU 102 to check the status bits or patch enable bits to determine which binning mode to use for execution of a corresponding workload of the command buffer 114. in some embodiments, the CPU 104 selectively sets the values of the status bits and patch enable bits based on identified performance characteristics (sometimes referred to herein as "performance data") of the device 100. In some embodiments, a single command buffer 114 is configured such that some workloads within the command buffer 114 are executed in the one-level binning mode and other workloads in the same command buffer 114 are executed in the two-level binning mode. For example, some workloads are only executable using one-level binning, and so the command buffer 114 is configured so that such workloads are executed in the one-level binning mode, even if two-level binning conditions are met and the two-level binning mode is enabled. In some embodiments, workloads are recorded onto the command buffer 114 by the UMD 110 to be executable in the one-level binning mode and the two-level binning mode, and the mode in which these workloads are executed in is subsequently selected by the GPU at the time the workloads are executed.

Generally, drivers in operating systems run in either user-mode or kernel-mode. UMDs, such as the UMD 110, run in the non-privileged processor mode in which other application code, including protected subsystem code, executes. UMDs cannot gain access to system data or hardware except by calling an application programming interface (API) which, in turn, calls system services. KMDs, such as the KMD 112 run as part of the operating system and support one or more protected subsystems. UMDs and KMDs have different structures, different entry points, and different system interfaces. KMDs are able to perform certain protected operations and are able to access system structures that UMDs cannot access. In one example, primitives generated by an application are recorded onto one or more command buffers by the UMD 110, and the KMD 112 submits the one or more command buffers to the GPU 102 for the subsequent rendering of the primitives or other commands stored in the one or more command buffers 114. The command processors 122 cause image data to be rendered in accordance with a particular render mode, such as the two-level binning mode or a non-two-level binning mode such as the PBB rendering mode. In some embodiments, the command processors 122 select which render mode to use to render image data associated with a particular command buffer 114 by determining whether the two-level binning mode is enabled or disabled. In some embodiments, the command processors 122 determine whether the two-level binning mode is enabled or disabled by checking one or more status bits stored in the GPU memory 124 or the system memory 106.

In some embodiments, the CPU 104 enables or disables the two-level binning mode based on performance data that includes performance counter data received from performance counters 116 stored at the system memory 106, sensor data 118 stored at the system memory 106 by sensors 108, or both. In some embodiments, the UMD 110 or the KMD 112 of the CPU 104 receives the performance data and processes the performance data to determine whether to enable or disable the two-level binning mode.

In some embodiments, the sensor data 118 generated by the sensors 108 includes one or more temperature measurements, voltage measurements, current measurements, instantaneous power measurements, peak power measurements, or other applicable sensor data. In some embodiments, the sensors 108 include one or more temperature sensors, current sensors, voltage sensors, or power sensors.

In some embodiments, the performance counters 116 track activity at various modules of the device, such as the battery 111, the CPU 104, the ring buffer 120, a level one (L1) cache, a level two (L2) cache, or shaders of the GPU 102. In some embodiments, the performance counter data includes one or more respective quantities of cache accesses, cache hit rates, cache miss rates, memory accesses, utilization rate of the GPU 102, utilization rate of the CPU 104, electric current supplied to the GPU 102, electric current supplied to the CPU 104, voltage at the GPU 102, voltage at the CPU 104, frequency of the GPU 102, and/or frequency of the CPU 104.

In some embodiments, the performance data includes one or more parameters that are derived from sensor data 118 or performance counter data generated by the performance counters 116, such as the average temperature of the device 100, the rate of change (RoC) of the average temperature of the device 100, the peak instantaneous power consumption of the device 100 over a given time period, the average power consumption of the device 100 over a given time period, the RoC of the average power consumption of the device 100, or the state of charge (SoC) of the battery 111 (i.e., the remaining charge of the battery 111 expressed as a percentage of the charge capacity of the battery 111). Herein, the "average temperature" of the device 100, refers to a mean, median, or mode of instantaneous temperatures measured at various locations of the device (e.g., at the CPU 104, at the GPU 102, at the battery 111, or a combination of these), a mean, median or mode of temperatures measured at the various locations of the device over a defined time period, a mean, median, or mode of estimated temperatures of the device 100 derived from estimated power consumption based on performance counter data generated by the performance counters 116 over a defined time period, according to various embodiments. Herein, the "average power consumption" of the device 100, refers to a mean, median, or mode of instantaneous power consumption measured at the battery 111 over a defined time period or a mean, median, or mode of estimated instantaneous power consumption based on performance counter data generated by the performance counters 116 over a defined time period, according to various embodiments.

The UMD 110 or the KMD 112 monitors the performance data to determine whether one or more pre-defined conditions for enabling the two-level binning mode, sometimes referred to herein as "two-level binning conditions", have occurred. In some embodiments, enabling or disabling the two-level binning mode involves the UMD 110 or the KMD 112 setting values of one or more status bits in the system memory 106 or the GPU 102 that are indicative of whether the two-level binning mode is enabled. In some embodiments, the two-level binning conditions include one or more of: the average temperature of the device exceeding a predefined temperature threshold, the RoC of the average temperature of the device exceeding a predefined RoC threshold, the local temperature at a defined location of the device exceeding a predefined temperature threshold, the RoC of such a local temperature exceeding a predefined RoC threshold, the peak instantaneous power consumption of the device exceeding a predefined threshold, the average power consumption of the device exceeding a predefined threshold, the RoC of the average power consumption of the device exceeding a predefined threshold, the battery SoC falling below a predefined SoC threshold, or a combination of these conditions. It should be understood that, in some embodiments, after a two-level binning condition is met and the two-level binning mode is enabled by the UMD 110 or the KMD 112, if that two-level binning condition is subsequently determined to no longer be met based on changes in the performance data, the device will disable the two-level binning mode. However, in some embodiments, other detectable conditions, sometimes referred to herein as "override conditions", override the detection of two-level binning conditions. For example, if the device 100 is determined by the UMD 110 or the KMD 112 to meet a two-level binning condition, but is determined to meet an override condition of being plugged in (e.g., if the battery is determined to be in a "charging" state), then the two-level binning mode is disabled. In some embodiments, alternative or additional override conditions are set, such as determining that the average power consumption of the device 100 drops below a threshold or determining that the GPU 102 or the CPU 104 is no longer being thermally throttled (e.g., which may be determined based on a clock frequency of the GPU 102 or the CPU 104 increasing above a threshold).

In some embodiments, when recording the command buffer 114, the UMD 110 will record a given workload in the command buffer 114 differently depending on whether the two-level binning mode is enabled or disabled based on the corresponding status bits stored in the system memory 106. For example, upon enabling the two-level binning mode, the UMD 110 records all subsequent command buffers 114 to be executable according to the two-level binning mode, at least until the two-level binning mode is disabled again. In some embodiments, upon disabling the two-level binning mode, the UMD 110 records all subsequent command buffers to be executable according to a non-two-level or single-level binning mode such as the single-level PBB mode. In some embodiments, the UMD 110 individually determines the binning mode for each of multiple workloads within a given command buffer 114 based on whether two-level binning mode is enabled at the time each workload is recorded by the UMD 110, and, in some instances, based on whether a given workload is able to be executed in the two-level binning mode.

For example, in some embodiments, the UMD 110 is configured to record workloads to command buffers 114 in the one-level binning mode by default, and is be configured to modify one or more workloads of the pending command buffers 114 to be executed in the two-level binning mode prior to submission to the GPU 102 when two-level binning conditions are met. In other embodiments, the UMD 110 is configured to record workloads to command buffers 114 in the two-level binning mode by default and is configured to modify one or more workloads of the pending command buffers 114 to be executed in the one-level binning mode prior to submission to the GPU 102 when two-level binning conditions are not met.

In some cases, the state of the two-level binning mode (i.e., enabled/disabled) changes after the UMD 110 records or begins to record one or more of the command buffers 114, referred to in such instances as "pending command buffers", but before the pending command buffers have been executed by the GPU 102. In some embodiments, such pending command buffers are modified via command buffer patching to be executed in accordance with the two-level binning mode or the non-two-level binning mode, depending on whether the two-level binning mode is enabled. Herein, command buffer patching refers to the modification of the data within a command buffer by a driver or other module executed by the CPU 104 or the GPU 102 and is performed at either the CPU 104 or at the GPU 102.

In one example, a pending command buffer 114 that was recorded when the two-level binning mode was enabled is modified by the CPU 104 or the GPU 102 via command buffer patching to execute in accordance with the non-two-level binning mode, responsive to a determination by the CPU 104 or the GPU 102 that the two-level binning mode has been disabled since the initiation of recording the pending command buffer 114. As another example, a pending command buffer 114 that was recorded when the two-level binning mode was disabled is modified by the CPU 104 or the GPU 102 via command buffer patching to execute in accordance with the two-level binning mode, responsive to a determination by the CPU 104 or the GPU 102 that the two-level binning mode has been enabled since the initiation of recording the pending command buffer 114.

For some embodiments in which command buffer patching is performed at the CPU 104, the UMD 110 performs command buffer patching near the end of the command buffer recording process. In some embodiments, when command buffer patching is performed at the CPU 104, the UMD performs command buffer patching immediately prior to submitting the command buffer 114 to the GPU 102, excluding instances when the pending command buffer 114 is configured to be executed more than once simultaneously (a pre-defined condition, which would be known at the time of recording the command buffer 114).

In some embodiments involving CPU-side command buffer patching, the UMD 110 stores metadata for each workload, where a workload is defined as a set of work or graphics draws for a given set of render targets, depth stencil targets, or both. In some embodiments, the metadata stored for each workload includes one or more tokens and one or more offsets. Each offset defines a location in the command buffer 114 that will need to be modified if the two-level-binning mode is enabled. Each token defines how the code of the command buffer 114 at the location defined in a corresponding offset should be modified if the two-level-binning mode is enabled. In one example, a token of the metadata causes the UMD 110 to modify code in the command buffer 114 that describes the visibility of primitives. In some embodiments, command buffer patching is only required when the two-level binning mode is enabled, and the UMD 110 initially (i.e., by default) records each workload to the command buffer 114 to execute in the non-two-level binning mode in such embodiments before making a determination at the end of the recording process or immediately before submitting the command buffer 114 as to whether to patch the command buffer 114 to be executable in the two-level binning mode. As indicated above, in some embodiments the UMD 110 alternatively records each workload to the command buffer 114 to execute in the two-level binning mode, at least for those workloads that are capable of being executed in the two-level binning mode and then determines whether to modify one or more of the workloads to instead execute in the non-two-level binning mode based on whether the two-level binning mode is enabled, in some instances, whether predefined override conditions are met.

At the GPU 102, command buffer patching is performed based on a value or a group of values, referred to herein as "patch enable values", which are stored in GPU memory 124. In some embodiments, each patch enable value is a single Boolean value corresponding to a respective pending command buffer 114. In some embodiments, the KMD 112 determines whether the two-level binning mode is enabled based on the corresponding status bits stored in the system memory 106 or based on analysis of the performance data, then the KMD 112 causes the patch enable values to be set according to whether the two-level binning mode is enabled prior to execution of the command buffer 114 by the GPU 102. For some embodiments in which GPU-side command buffer patching is performed, the UMD 110 must record the command buffer 114 to be executable in both the two-level binning mode both the non-two-level binning mode, and the command processor(s) 122 determine(s) which mode to execute the command buffer 114 in based on the corresponding patch enable value(s).

In some embodiments, the patch enable values could instead be command-buffer-based patch enable values that are stored on the command buffers 114 by the UMD 110 during recording, such that when the GPU 102 executes a given command buffer 114, it checks one or more patch enable values for each workload. In such embodiments, the command buffer 114 self-modifies one or more workloads on the command buffer 114 to be executable in the two-level binning mode or the non-two-level binning mode based on the command-buffer-based patch enable values during execution of the command buffer 114 by the GPU 102. For example, in some embodiments, a command processor of the GPU 102 or a shader core of the GPU 102 modifies the command buffer 114 if GPU-side command buffer patching is needed, which is determined based on patch enable bits stored at the GPU memory 124 or status bits stored at the system memory 106 as described previously.

Figure 2:
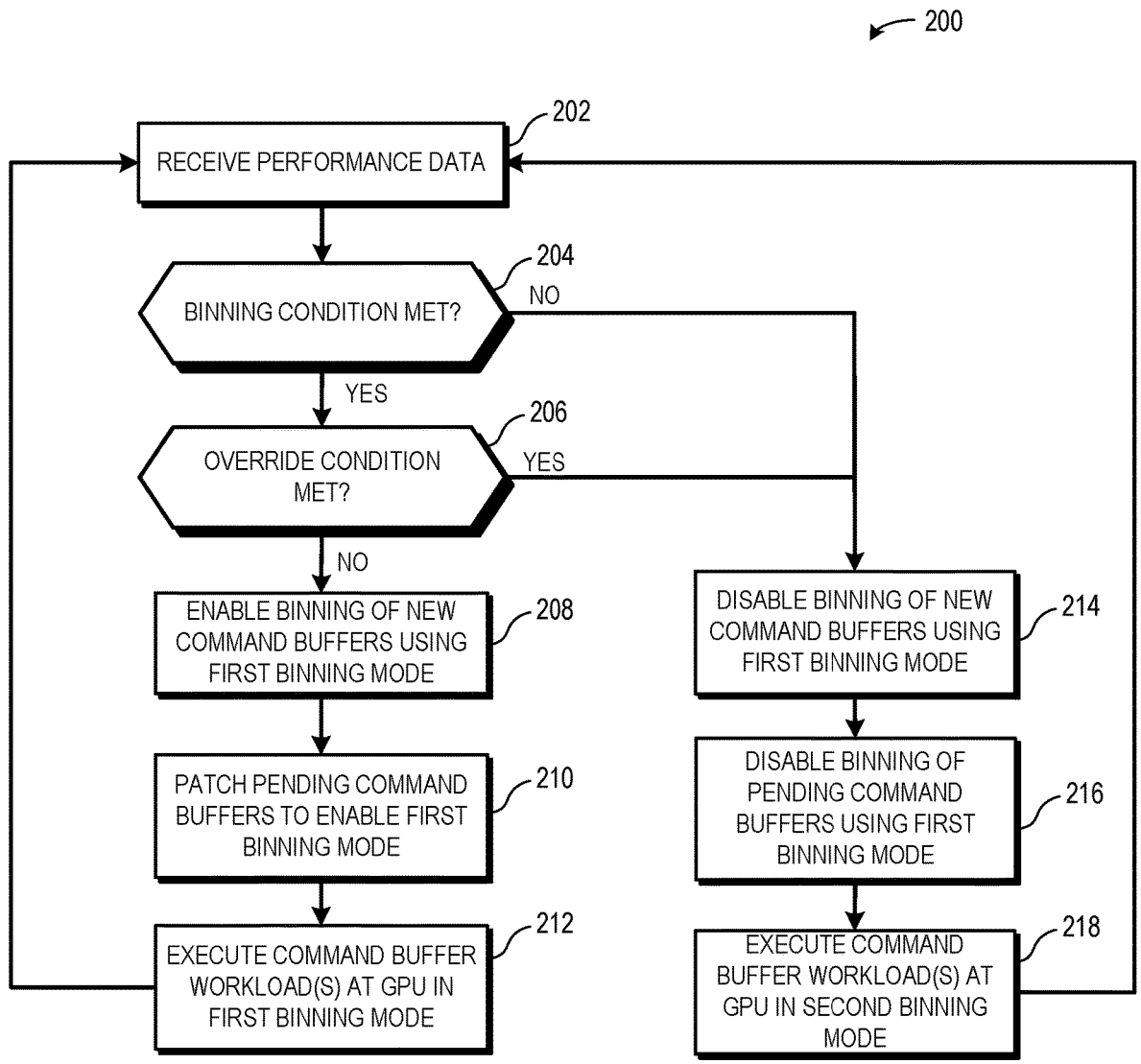
FIG. 2 is a flow diagram illustrating a method for selectively setting a binning mode based on GPU performance data, in accordance with some embodiments.

FIG. 2 shows an illustrative process flow for a method 200 of selectively executing command buffers in a first binning mode or in a second binning mode based on performance data acquired from performance counters or sensors, in accordance with some embodiments. In some embodiments, the first binning mode is a two-level binning mode and the second binning mode is a single-level binning mode such as a PBB mode. The method 200 is described with respect to an example implementation at the device 100 of FIG. 1 and its constituent components and modules.

At block 202, the UMD 110 or the KMD 112 receives performance data. In some embodiments, the performance data includes sensor data 118 generated by the sensors 108.

In some embodiments, the performance data includes performance counter data generated by the performance counters 116. In some embodiments, the performance data includes both the performance counter data and the sensor data 118. In some embodiments, the sensor data 118 generated by the sensors 108 includes one or more temperature measurements, voltage measurements, current measurements, instantaneous power measurements, peak power measurements, or other applicable sensor data. In some embodiments, the performance data includes one or more respective quantities of cache accesses, cache hit rates, cache miss rates, memory accesses, utilization rate of the GPU 102, utilization rate of the CPU 104, electric current supplied to the GPU 102, electric current supplied to the CPU 104, voltage at the GPU 102, voltage at the CPU 104, frequency of the GPU 102, and/or frequency of the CPU 104, each corresponding to activity occurring at one or more modules of the device 100 such as the battery 111, the CPU 104, the ring buffer 120, a level one (L1) cache, a level two (L2) cache, or shaders of the GPU 102. In some embodiments, the performance data includes one or more parameters that are derived from sensor data 118 or performance counter data generated by the performance counters 116, such as the average temperature of the device, the rate of change (RoC) of the average temperature of the device, the peak instantaneous power consumption of the device during a given time period, the average power consumption of the device over a given time period, the RoC of the average power consumption of the device, or the state of charge (SoC) of the battery (i.e., the remaining charge of the battery, which in some embodiments is expressed as a percentage of the charge capacity of the battery). In some embodiments, the derived parameters are calculated by the UMD 110 or the KMD 112.

At block 204, the UMD 110 or the KMD 112 determines whether a binning condition has been met based on the performance data. For example, in some embodiments, the binning condition includes one or more two-level binning conditions including one or more of: the average temperature of the device exceeding a predefined temperature threshold, the RoC of the average temperature of the device exceeding a predefined RoC threshold, the local temperature at a defined location of the device exceeding a predefined temperature threshold, the RoC of such a local temperature exceeding a predefined RoC threshold, the peak instantaneous power consumption of the device exceeding a predefined threshold, the average power consumption of the device exceeding a predefined threshold, the RoC of the average power consumption of the device exceeding a predefined threshold, the battery SoC falling below a predefined SoC threshold, or a combination of these conditions. If the UMD 110 or the KMD 112 determines that a binning condition has been met, the method 200 proceeds to block 206. Otherwise, if the UMD 110 or the KMD 112 determines that a binning condition has not been met, the method 200 proceeds to block 214.

At block 206, the UMD 110 or the KMD 112 determines whether an override condition has been met based on the performance data. For example, the override conditions can include one or more of: the device 100 entering a charging condition in which the battery 111 is being charged, the average temperature of the device 100 falling below a predetermined threshold, the RoC of the average temperature of the device 100 falling below a predetermined threshold, or a combination of these. If the UMD 110 or the KMD 112 determines that the override condition has not been met, the method 200 proceeds to block 208. Otherwise, if the UMD 110 or the KMD 112 determines that the override condition has been met, the method 200 proceeds to block 214.

At block 208, the UMD 110 or the KMD 112 enables a first binning mode for newly created command buffers. In some embodiments, the first binning mode is the two-level binning mode. For example, to enable the first binning mode, the UMD 110 or the KMD 112 sets status bit values in the system memory 106 to indicate that the first binning mode is enabled. In some embodiments, when recording subsequent command buffers, the UMD 110 checks the status bit values and determines that the command buffers should be recorded to execute in the first binning mode.

At block 210, the CPU 104 or the GPU 102 patches workloads of pending command buffers to enable execution of those workloads in the first binning mode. In some embodiments, the UMD 110 patches workloads of a given pending command buffer at the CPU 104 to execute in the first binning mode at the end of the recording process for the workloads of the pending command buffer. In some embodiments, the UMD 110 patches workloads of a given pending command buffer at the CPU 104 to execute in the first binning mode after completion of recording and before (e.g., immediately before) submitting the command buffer to the GPU 102. In some embodiments, the GPU 102 patches workloads a given pending command buffer to execute in the first binning mode prior to (e.g., immediately prior to) execution of the pending command buffer based on one or more patch enable values stored in the GPU memory 124.

At block 212, the command buffers are executed at the GPU 102 in the first binning mode.

At block 214, the UMD 110 or the KMD 112 disables the first binning mode for newly created command buffers. For example, to disable the first binning mode, the UMD 110 or the KMD 112 sets status bit values in the system memory 106 to indicate that the first binning mode is disabled. In some embodiments, when recording workloads of subsequent command buffers, the UMD 110 checks the status bit values and determines that, where applicable, workloads of the command buffers should be recorded to execute in a second binning mode. In some embodiments, the second binning mode is a PBB mode.

At block 216, UMD 110 or the KMD 112 disables the first binning mode for pending command buffers. For embodiments in which the UMD 110 records workloads of the command buffers to be executed in the second binning mode by default, block 216 is skipped, as no further action beyond modifying the status bits at block 214 is required to disable the first binning mode. For some embodiments in which GPU-side command buffer patching is performed, the KMD 112 disables the first binning mode for pending command buffers by setting one or more patch enable values in the GPU memory 124 to indicate that the first binning mode is disabled.

At block 218, the command buffers are executed at the GPU 102 in the second binning mode.

Figure 3:
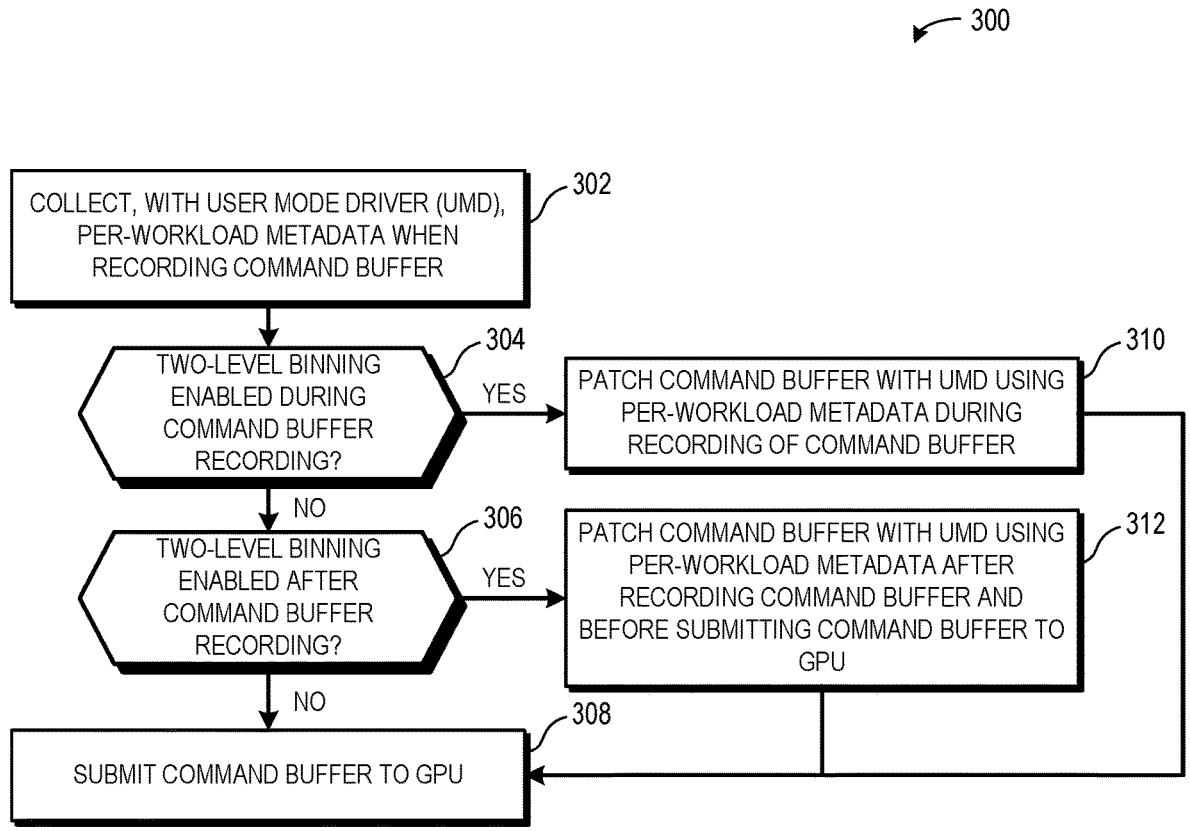
FIG. 3 is a flow diagram illustrating a method for selective patching a pending command buffer prior to submitting the command buffer to the GPU based on a determined binning mode, in accordance with some embodiments.

FIG. 3 shows an illustrative process flow for a method 300 of selectively patching command buffers at a CPU to be executable in a two-level binning mode or in a non-two-level binning mode, in accordance with some embodiments. The method 300 is described with respect to an example implementation at the device 100 of FIG. 1 and its constituent components and modules. In some embodiments, the method 300 is performed in conjunction with block 210 of FIG. 2.

At block 302, the UMD 110 collects metadata for each workload (i.e., "per-workload metadata") of a given command buffer 114 when recording the workloads in the command buffer 114. In some embodiments, the metadata stored for each workload includes one or more tokens and one or more offsets. Each offset defines a location in the command buffer 114 that will need to be modified if the two-level-binning mode is enabled in order to execute a corresponding workload of the command buffer 114. Each token defines how the code of the command buffer 114 at the location defined in a corresponding offset should be modified if the two-level-binning mode is enabled. In one example, a token of the metadata causes the UMD 110 to modify code in the command buffer 114 that describes the visibility of primitives if the two-level binning mode is enabled.

At block 304, the UMD 110 determines whether the two-level binning mode is enabled at or near the end of the recording process for the command buffer 114. In some embodiments, the UMD 110 checks the value of one or more status bits stored in the system memory 106 to determine whether the two-level binning mode is enabled. If the two-level binning mode is determined to be enabled, the method proceeds to block 310. If the two-level binning mode is determined to be disabled, the method 300 proceeds to block 306.

At block 306, the UMD 110 determines whether the two-level binning mode is enabled after recording the command buffer 114 and prior to (e.g., immediately prior to) submitting the command buffer 114 to the GPU 102. In some embodiments, the UMD 110 checks the value of one or more status bits stored in the system memory 106 to determine whether the two-level binning mode is enabled. If the two-level binning mode is determined to be enabled, the method proceeds to block 312. If the two-level binning mode is determined to be disabled, the method 300 proceeds to block 308.

At block 308, the KMD 112 submits the command buffer 114 to the GPU 104.

At block 310, the UMD 110 patches the command buffer 114 to make one or more workloads of the command buffer 114 to be executable in the two-level binning mode based on the per-workload metadata during the recording of the command buffer 114 (e.g., near the end of the recording process). Generally, the way in which the command buffer 114 is patched by the UMD 110 depends on the hardware implementation of the device 100.

In one example, two-level binning inherently uses visibility information in a buffer (i.e., a "visibility information buffer") as a basis for determining which primitives are visible in which bin. In the present example, the UMD 110 records a workload in a command buffer 114 to be executed using one-level binning, the UMD does not include a command for the GPU to bind such a visibility information buffer, whereas the workload would need to include such a command if the workload were recorded by the UMD 110 to be executed using two-level binning. The UMD 110, therefore, generates metadata including a token and an offset that indicate the location in the command buffer 114 where the command to bind the visibility information buffer would need to be included for the workload if executed in the two-level binning mode. In this way, when the two-level binning mode is enabled prior to submitting the command buffer 114 to the GPU 102, the UMD 110 or the KMD 112 patches the workload of the command buffer 114 to include the command to bind the visibility information buffer at the location indicated in the metadata.

In another example, the GPU 102 generally needs to receive bin information indicating how many bins exist, the size of those bins, and/or the order in which the bins should be processed if executing in the two-level binning mode. In the present example, the UMD 110 generates metadata for each workload recorded in a command buffer 114 that includes binning information indicative of the number of bins, the size of each bin, and the order in which the bins should be processed, where the binning information is needed to execute that workload in the two-level binning mode. In this way, when the two-level binning mode is enabled prior to submitting the command buffer 114 to the GPU 102, the UMD 110 or the KMD 112 patches the workload of the command buffer 114 to include the binning information indicated in the metadata.

At block 312, the UMD patches the command buffer 114 to make one or more workloads of the command buffer 114 to be executable in the two-level binning mode based on the per-workload metadata after recording the command buffer 114 and before submitting the command buffer 114 to the GPU 102.

Figure 4:
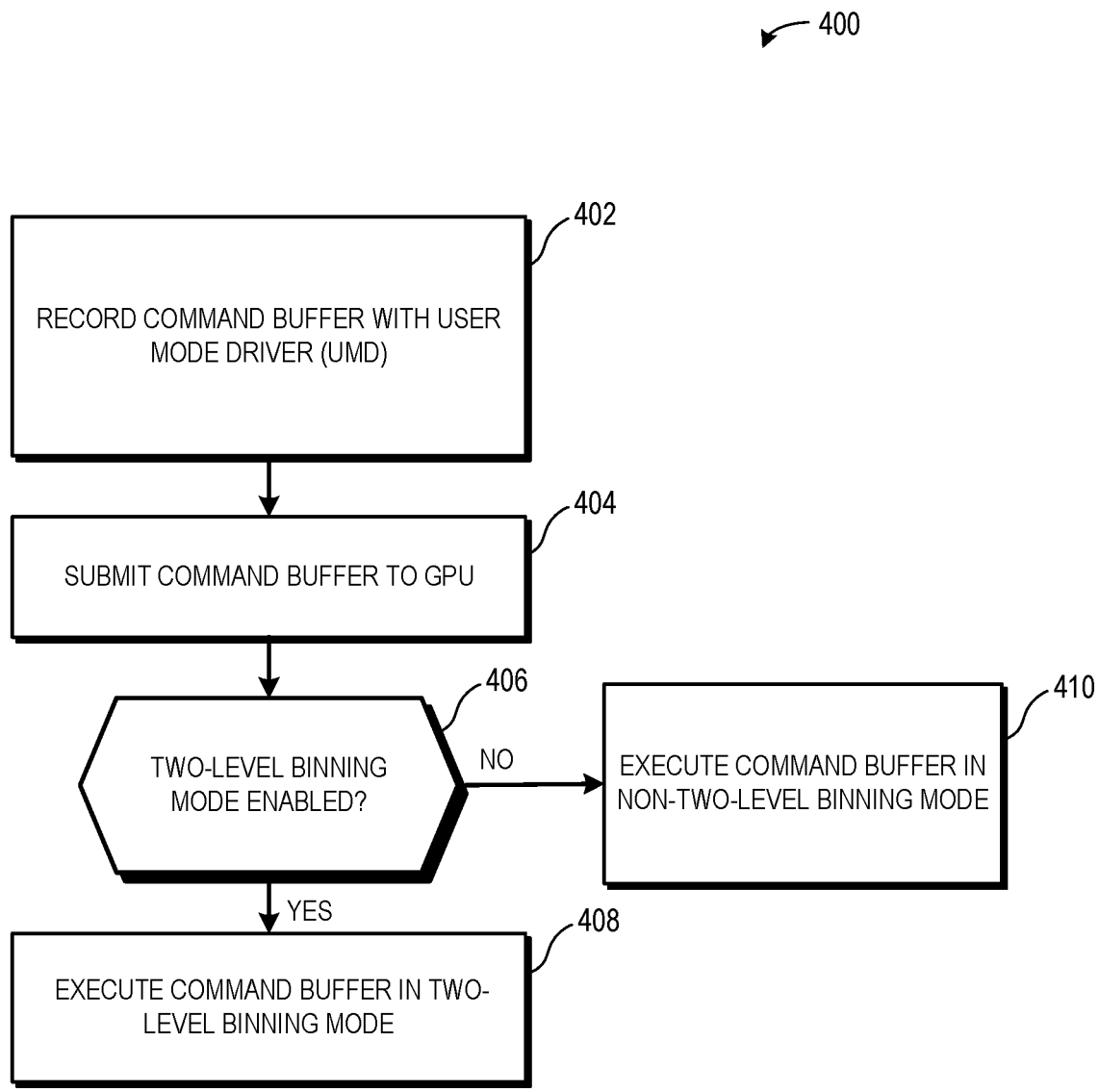
FIG. 4 is a flow diagram illustrating a method for selective execution of command buffer workloads in a two-level binning mode or a non-two-level binning mode after the command buffer has been submitted the GPU and prior to the execution of the command buffer by the GPU based on whether the two-level binning mode is enabled, in accordance with some embodiments.

FIG. 4 shows an illustrative process flow for a method 400 of selectively executing workloads of command buffers at a GPU to in a two-level binning mode or in a non-two-level binning mode, in accordance with some embodiments. In some embodiments, the GPU performs command buffer patching of the command buffers to make the workloads executable in either the two-level binning mode or the non-two-level binning mode based on corresponding metadata generated by a UMD. The method 400 is described with respect to an example implementation at the device 100 of FIG. 1 and its constituent components and modules. In some embodiments, the method 400 is performed in conjunction with block 210 of FIG. 2.

At block 402, the UMD 110 records the command buffer 114 to include one or more workloads. In some embodiments, the UMD 110 records to workloads to be executable in either of the two-level binning mode or the non-two-level binning mode without patching. In some other embodiments, the UMD 110 records the workloads to be executed in the non-two-level binning mode by default, and generates metadata that allows the GPU 102 to modify the workloads to be executed in the two-level binning mode, if required (i.e., if the two-level binning mode is enabled after the workloads are recorded in the command buffer 114 and before their execution by the GPU 102).

In one example, the UMD 110 records the command buffer 114 to include a conditional statement for one or more workloads of the command buffer 114, where the conditional statement causes the GPU 102 to check a patch enable value stored at a register in the GPU memory 124 and execute the one or more workloads in a two-level binning mode or a non-two-level binning mode depending on the value of the patch enable value. In some embodiments, the patch enable value is a Boolean value stored in a single bit of the register in the GPU memory 124. In some embodiments, the patch enable value is set by the UMD 110 or the KMD 112.

At block 404, the KMD 112 submits the command buffer 114 to the GPU 104. In some embodiments, upon submission to the GPU 102, the command buffer 114 is added to the ring buffer 120.

At block 406, the GPU 102 determines whether the two-level binning mode is enabled. In some embodiments, the GPU 102 checks one or more patch enable values stored at the GPU memory 124 to determine whether the two-level binning mode is enabled. In some embodiments, the KMD 112 determines whether the two-level binning mode is enabled based on corresponding performance data and sets the patch enable values in the GPU memory 124 accordingly. If the GPU 102 determines that the two-level binning mode is enabled, the method 400 proceeds to block 408. Otherwise, if the GPU 102 determines that the two-level binning mode is not enabled, the method 400 proceeds to block 410.

At block 408, the GPU 102 executes one or more workloads of the command buffer 114 in the two-level binning mode. In some embodiments, the GPU 102 utilizes metadata generated by the UMD 110 during recording of the command buffer 114, as described above, to patch one or more workloads of the command buffer 114 to execute in the two-level binning mode in response to determining that the patch enable value indicates that those workloads should be executed in the two-level binning mode. In some other embodiments, the UMD 110 records each workload that can possibly be executed in the two-level binning mode to be executable in either the two-level binning mode or the non-two-level binning mode, and the GPU 102 is configured to execute those workloads in a selected one of the two-level binning mode or the non-two-level binning mode based on the patch enable value.

At block 410, the GPU 102 executes one or more workloads of the command buffer 114 in the non-two-level binning mode. In some embodiments, the non-two-level binning mode is a PBB render mode.

In some embodiments, the apparatus and techniques described above are implemented in a system including one or more integrated circuit (IC) devices (also referred to as integrated circuit packages or microchips), such as the device 100 including the GPU 102, CPU 104, and system memory 106 as described above with reference to FIG. 1. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   based on performance data indicating a two-level binning condition has been met,
   patching a pending command buffer to be executable in a two-level binning mode, wherein;
      the performance data is indicative of temperature or power consumption of a device;
      the two-level binning mode is one of two or more binning modes executable by a graphics processing unit (GPU), the two or more binning modes including a single-level binning mode and the two-level binning mode; and the two-level binning mode includes:
dividing an image frame associated with the pending command buffer into a plurality of coarse bins; and
for each coarse bin of the plurality of coarse bins:
dividing the coarse bin into a plurality of fine bins; and
rendering primitives associated with the pending command buffer based on how the primitives intercept the plurality of fine bins of the coarse bin; and
with the GPU, executing the pending command buffer in the two-level binning mode.

2. The method of claim 1, wherein the two-level binning condition comprises one or more of: an average temperature of a device that includes the GPU exceeding a first predefined temperature threshold, a first rate of change of the average temperature of the device exceeding a second predefine threshold, a local temperature at a defined location of the device exceeding a third predefined threshold, a second rate of change of the local temperature exceeding a fourth predefined threshold, an average power consumption of the device exceeding a fifth predefined threshold, a peak instantaneous power consumption of the device exceeding a sixth predefined threshold, or a state of charge of a battery being below a seventh predefined threshold.

3. The method of claim 1, wherein the performance data comprises one or more of: an average temperature of a device that includes the GPU, a first rate of change of the average temperature of the device, an average power consumption of the device, a second rate of change of the average power consumption, a peak instantaneous power consumption of the device, or a state of charge of a battery of the device.

4. The method of claim 1, further comprising:
collecting per-workload metadata for the pending command buffer during recording of the pending command buffer, wherein patching the pending command buffer is performed based on the per-workload metadata.

5. The method of claim 4, further comprising:
determining that the two-level binning condition has been met based on the performance data while recording the pending command buffer, wherein patching the pending command buffer occurs while recording the pending command buffer.

6. The method of claim 4, further comprising:
determining that the two-level binning condition has been met based on the performance data after recording the pending command buffer and before the pending command buffer is submitted to the GPU, wherein patching the pending command buffer occurs after recording the pending command buffer and before the pending command buffer is submitted to the GPU.

7. The method of claim 1, wherein patching the pending command buffer to be executable in the two-level binning mode comprises:
with the GPU, patching the pending command buffer to be executable in the two-level binning mode based on at least one patch enable value stored in a memory of the GPU.

8. A device comprising:
a central processing unit (CPU) configured to:
based on performance data indicating a two-level binning condition has been met, patch a pending command buffer to be executable in a two-level binning mode, wherein:
the performance data is indicative of temperature or power consumption of a device; and
the two-level binning mode includes:
dividing an image frame associated with the pending command buffer into a plurality of coarse bins; and
for each coarse bin of the plurality of coarse bins:
dividing the coarse bin into a plurality of fine bins; and
rendering primitives associated with the pending command buffer based on how the primitives intercept the plurality of fine bins of the coarse bin; and
a graphics processing unit (GPU) configured to execute the pending command buffer in the two-level binning mode, wherein the two-level binding mode is one or two or more binning modes executable by the GPU and the two or more binning modes include a single-level binning mode and the two-level binning mode.

9. The device of claim 8, wherein the CPU is configured to collect per-workload metadata for the pending command buffer during recording of the pending command buffer, wherein patching the pending command buffer is performed based on the per-workload metadata, wherein the per-workload metadata comprises an offset that identifies a location of code in the pending command buffer that is to be modified via patching in the two-level binning mode and a token that identifies how the code is to be modified in the two-level binning mode.

10. The device of claim 8, wherein the CPU is configured to determine that the two-level binning condition has been met based on the performance data while recording the pending command buffer and to patch the pending command buffer while recording the pending command buffer.

11. The device of claim 8, wherein the CPU is configured to determine that the two-level binning condition has been met based on the performance data after recording the pending command buffer and before the pending command buffer is submitted to the GPU, and to patch the pending command buffer after recording the pending command buffer and before the pending command buffer is submitted to the GPU.

12. A device comprising:
a central processing unit (CPU) configured to:
based on performance data indicating a two-level binning condition has been met, enable a two-level binning mode, wherein:
the performance data is indicative of temperature or power consumption of a device; and
the two-level binning mode includes:
dividing an image frame associated with a pending command buffer into a plurality of coarse bins; and
for each coarse bin of the plurality of coarse bins:
dividing the coarse bin into a plurality of fine bins; and
rendering primitives associated with the pending command buffer based on how the primitives intercept the plurality of fine bins of the coarse bin; and
a graphics processing unit (GPU) configured to:
based on the two-level binning mode being enabled, patch the pending command buffer to be executable in the two-level binning mode; and
execute the pending command buffer in the two-level binning mode, wherein the two-level binning mode is one of two or more binning modes executable by the GPU and wherein the two or more binning modes includes a single-level binning mode and the two-level binning mode.

13. The device of claim 12, further comprising:

a first sensor configured to generate temperature data indicative of the temperature of the device; and a second sensor configured to generate power consumption data indicative of the power consumption of the device, wherein the CPU is configured to calculate the performance data based on at least one of the temperature data or the power consumption data.

14. The device of claim 12, further comprising:

at least one performance counter configured to generate performance counter data indicative of activity occurring at the device, wherein the CPU is configured to calculate the performance data based on the performance counter data.

\* \* \* \* \*